(12) United States Patent
Vacca et al.

(10) Patent No.: US 10,787,141 B2
(45) Date of Patent: Sep. 29, 2020

(54) AGS WITH DISPLACEABLE ACTUATOR

(71) Applicant: Valeo Systemes Thermiques, Le Mesnil Saint Denis (FR)

(72) Inventors: Frédéric Vacca, Le Mesnil Saint-Denis (FR); Enzo Mitidieri, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 187 days.

(21) Appl. No.: 15/767,688

(22) PCT Filed: Oct. 11, 2016

(86) PCT No.: PCT/FR2016/052622
§ 371 (c)(1),
(2) Date: Apr. 12, 2018

(87) PCT Pub. No.: WO2017/064408
PCT Pub. Date: Apr. 20, 2017

(65) Prior Publication Data
US 2018/0304843 A1    Oct. 25, 2018

(30) Foreign Application Priority Data
Oct. 15, 2015  (FR) ...................................... 15 59807

(51) Int. Cl.
*B60R 19/52* (2006.01)
*B60K 11/08* (2006.01)
*B60R 21/34* (2011.01)

(52) U.S. Cl.
CPC ............ *B60R 19/52* (2013.01); *B60K 11/085* (2013.01); *B60R 21/34* (2013.01);
(Continued)

(58) Field of Classification Search
CPC ....... B60R 19/52; B60R 21/34; B60K 11/085; B60Y 2306/01
See application file for complete search history.

(56) References Cited

U.S. PATENT DOCUMENTS 3,210,003 A * 10/1965 Quinton .................... F01P 7/12
236/35.2
5,205,484 A *  4/1993 Susa ..................... B60H 1/3227
236/35.3
(Continued)

FOREIGN PATENT DOCUMENTS

DE    39 16 907 A1   12/1989
FR    2 945 777 A1   11/2010
(Continued)

OTHER PUBLICATIONS

International Search Report issued in PCT/FR2016/052622 dated Jan. 17, 2017 (3 pages).
(Continued)

*Primary Examiner* — Karen Beck
(74) *Attorney, Agent, or Firm* — Osha Liang LLP

(57) ABSTRACT

The invention relates to a device (AGS) for controlling the air intake for a front face module for a motor vehicle, comprising shutters (SHT1, SHT2), an actuator (ACT) arranged so as to control the shutters (SHT1, SHT2), and a flexible connection (STR, ROD) connecting the actuator (ACT) to the shutters (SHT1, SHT2), which can displace the actuator (ACT) in order to prevent it (ACT) from causing damage to an entity (PED, OBS) in the event of a collision between the motor vehicle and said entity (PED, OBS). The invention also relates to a front face module for a motor vehicle comprising such an air intake control device.

7 Claims, 4 Drawing Sheets

(52) U.S. Cl.
CPC ..... *B60R 2019/527* (2013.01); *B60Y 2306/01* (2013.01); *Y02T 10/88* (2013.01)

(56) References Cited

U.S. PATENT DOCUMENTS

| | | | | |
|---|---|---|---|---|
| 6,390,217 | B1* | 5/2002 | O'Brien | B60K 11/04 160/DIG. 1 |
| 2003/0029852 | A1* | 2/2003 | Ozawa | F01P 7/12 219/205 |
| 2011/0281515 | A1* | 11/2011 | Lockwood | B60K 11/085 454/75 |
| 2012/0132474 | A1* | 5/2012 | Charnesky | B60K 11/085 180/68.1 |
| 2012/0241128 | A1* | 9/2012 | Vacca | B60K 11/04 165/44 |
| 2012/0247018 | A1* | 10/2012 | Stokes | B60R 19/48 49/89.1 |
| 2015/0047811 | A1 | 2/2015 | Kappelman et al. | |
| 2015/0321547 | A1* | 11/2015 | Pickl | F01P 11/08 180/68.1 |
| 2018/0178845 | A1* | 6/2018 | Hayashi | B62D 25/084 |
| 2018/0361847 | A1* | 12/2018 | Vacca | B60K 11/085 |
| 2019/0126741 | A1* | 5/2019 | Sakashita | B60K 11/06 |
| 2019/0226386 | A1* | 7/2019 | Jolk | F01P 11/20 |
| 2019/0248226 | A1* | 8/2019 | Shinohara | B60K 11/04 |
| 2020/0055388 | A1* | 2/2020 | Gerber | B60R 11/04 |

FOREIGN PATENT DOCUMENTS

| | | |
|---|---|---|
| WO | 2012/012535 A2 | 1/2012 |
| WO | 2015/001073 A1 | 1/2015 |

OTHER PUBLICATIONS

Written Opinion of the International Searching Authority issued in PCT/FR2016/052622 dated Jan. 17, 2017 (5 pages).

* cited by examiner

AGS WITH DISPLACEABLE ACTUATOR

The invention concerns an air intake control device. Such a device is sometimes known by the acronym AGS, or Active Grille Shutter. The device allows opening or closure of the air access to an engine compartment via a set of shutters arranged on the front face of the motor vehicle. In the open position, air can circulate through the air intake and participate in cooling the engine of the motor vehicle. In the closed position, air cannot penetrate through the radiator or the front face panel, which reduces the coefficient of drag and thus allows a reduction in fuel consumption and CO2 emissions. The AGS device therefore allows a reduction in energy consumption and pollution when the engine does not need to be cooled by the external air.

A front face module or front face structure for a motor vehicle comprises a front face support (known as a bolster) which generally comprises an upper crossmember attached to a lower crossmember via two legs arranged vertically in the motor vehicle.

In the known fashion, such a front face module may extend in the motor vehicle from an apron to a bulkhead of the vehicle, and allow stabilization of an engine compartment and support for a motorized fan unit, while forming a separation from the vehicle cab.

In the design of a motor vehicle, it is useful to ensure that the consequences of an accident during which the motor vehicle hits an obstacle are reduced as far as possible. In particular, the risk of physical injury (in particular when a pedestrian is run over by the motor vehicle) should be reduced, but also the material damage to the motor vehicle itself should be reduced.

An AGS device conventionally comprises an actuator controlling the shutters, allowing opening or closure of the air intake. The shutters and the frame of the AGS device supporting the shutters are normally made of plastic. This material has the advantage of being lightweight and cheap. Furthermore, in the case of impact, the plastic deforms or breaks easily, damping the impact and reducing the risk of serious damage. In contrast, the actuator is a relatively bulky device which is furthermore very dense. In the case of impact, the actuator is often damaged, leading to significant repair costs. Also, in the case of impact with a pedestrian, the actuator is liable to cause more serious injuries than those which might be caused by just the shutters of the AGS device.

The aim of the invention is to remedy these drawbacks at least partially.

The invention relates in particular to an air intake control device for a front face module for a motor vehicle, comprising:
  shutters,
  an actuator, for example electric, arranged so as to control the shutters, and
  a flexible connection connecting the electric actuator to the shutters and able to displace the actuator in order to prevent it from causing damage to an entity in the event of a collision between the motor vehicle and said entity.

Such a device is doubly advantageous. Firstly, it minimizes damage to third parties, and secondly it minimizes damage to the air intake control device, and in particular the actuator, by fixing the actuator in a protected zone. This zone may be remote from the shutters of the actuator which are situated at the front of the vehicle and often impacted first in the case of accident.

Further embodiments of the air intake control device propose that
  the flexible connection comprises a cable;
  the flexible connection comprises a linkage.

The invention also concerns a front face module for a motor vehicle comprising:
  a protection element,
  an air intake control device as described above,
  wherein the actuator is fixed to the protection element, this protection element being for example situated between the actuator and the shutters.

Further embodiments of the front face module for a motor vehicle propose that:
  the protection element is a bumper beam;
  a first series of shutters is located above the bumper beam, and a second series of shutters is located below the bumper beam, the actuator being arranged to control the two series of shutters independently;
  the module comprises a radiator support and a radiator, the radiator support constituting the protection element;
  the module comprises a radiator and a shroud fixed behind the radiator in order to conduct the air passing through the radiator, wherein the actuator is fixed inside the shroud.

Further characteristics and advantages of the invention will appear from reading the description below. This is purely illustrative and should be read in connection with the attached drawings, on which:

On the figures, substantially identical elements carry the same references.

The following embodiments are merely examples. Although the description refers to one or more embodiments, this does not necessarily mean that each reference concerns the same embodiment, or that the characteristics apply only to a single embodiment. Single characteristics of different embodiments may also be combined to form other embodiments.

Figure 1:
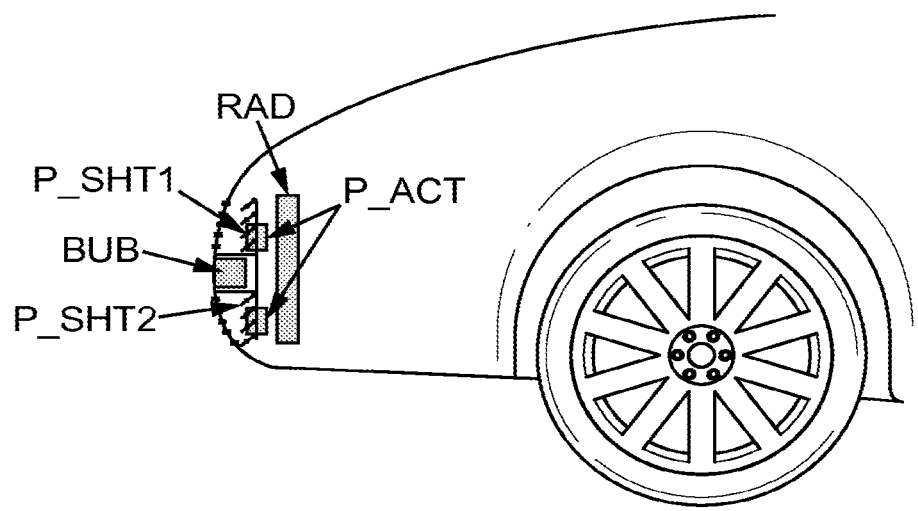
FIGS. 1 to 3 illustrate AGS devices according to the prior art.

FIG. 1 illustrates, in the form of a longitudinal section, a portion of the front face structure of a vehicle comprising an air intake control device AGS situated in front of a radiator RAD. An air intake control or closure device AGS for a motor vehicle comprises an assembly, consisting of a support frame defining the air intake and a set of shutters able to close said air intake. The device AGS is equipped with an actuator P_ACT, here comprising two sub-elements (which may be two independent actuators together forming the actuator of the device AGS). A bumper beam BUB is placed in a horizontal plane of the motor vehicle, perpendicularly to a longitudinal axis of the vehicle. A first sub-element is situated above the bumper beam BUB and controls a series of shutters P_SHT1 situated above said beam. A second sub-element of the actuator P_ACT is situated below the bumper beam BUB and controls a series of shutters P_SHT2 situated below said beam. The elements of the actuator P_ACT are situated at the level of (immediately next to) the shutters they control. These elements of the actuator P_ACT, which lie on a critical path, risk being damaged in the case of accident. Also, in the case of an accident involving a pedestrian, these elements—which are dense—risk injuring the pedestrian.

Figure 2:
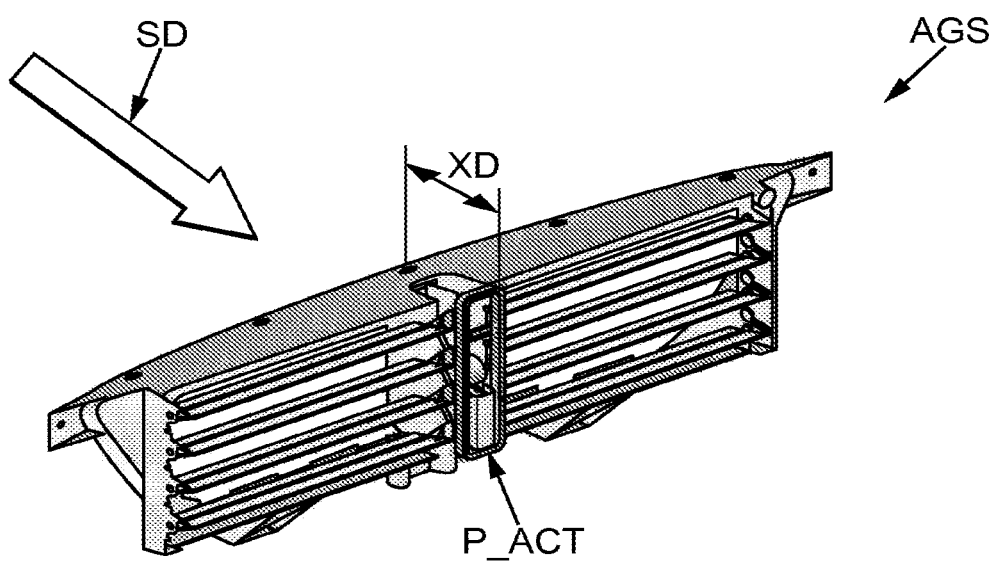

FIG. 2 is a three-dimensional depiction of a device AGS in which the monobloc actuator P_ACT is placed centrally between two series of shutters P_SHT1 and P_SHT2. The arrow SD indicates the direction of a collision of a motor vehicle (not shown), equipped with the device AGS, against an obstacle. This direction reflects the speed vector direction of the obstacle in the reference system of the device AGS of the motor vehicle, at the time of impact of the obstacle on the motor vehicle. The dimension along an X axis of the actuator P_ACT is represented by reference XD.

Figure 3:
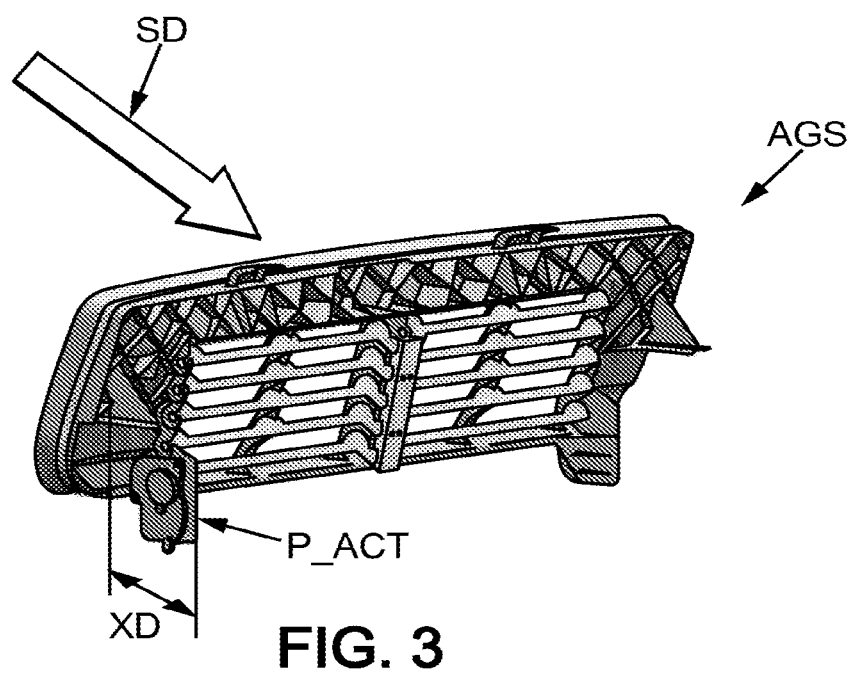

FIG. 3 shows, also three-dimensionally, a variant of the device AGS of FIG. 2 in which the actuator P_ACT is placed laterally on the support frame of the device AGS. As in the device AGS of FIG. 2, the actuator P_ACT is situated very much to the front of the front face module of the vehicle and is not protected. It is liable to be damaged and cause injury.

The invention relates to an air intake control device AGS for a front face module of a motor vehicle.

Figure 4:
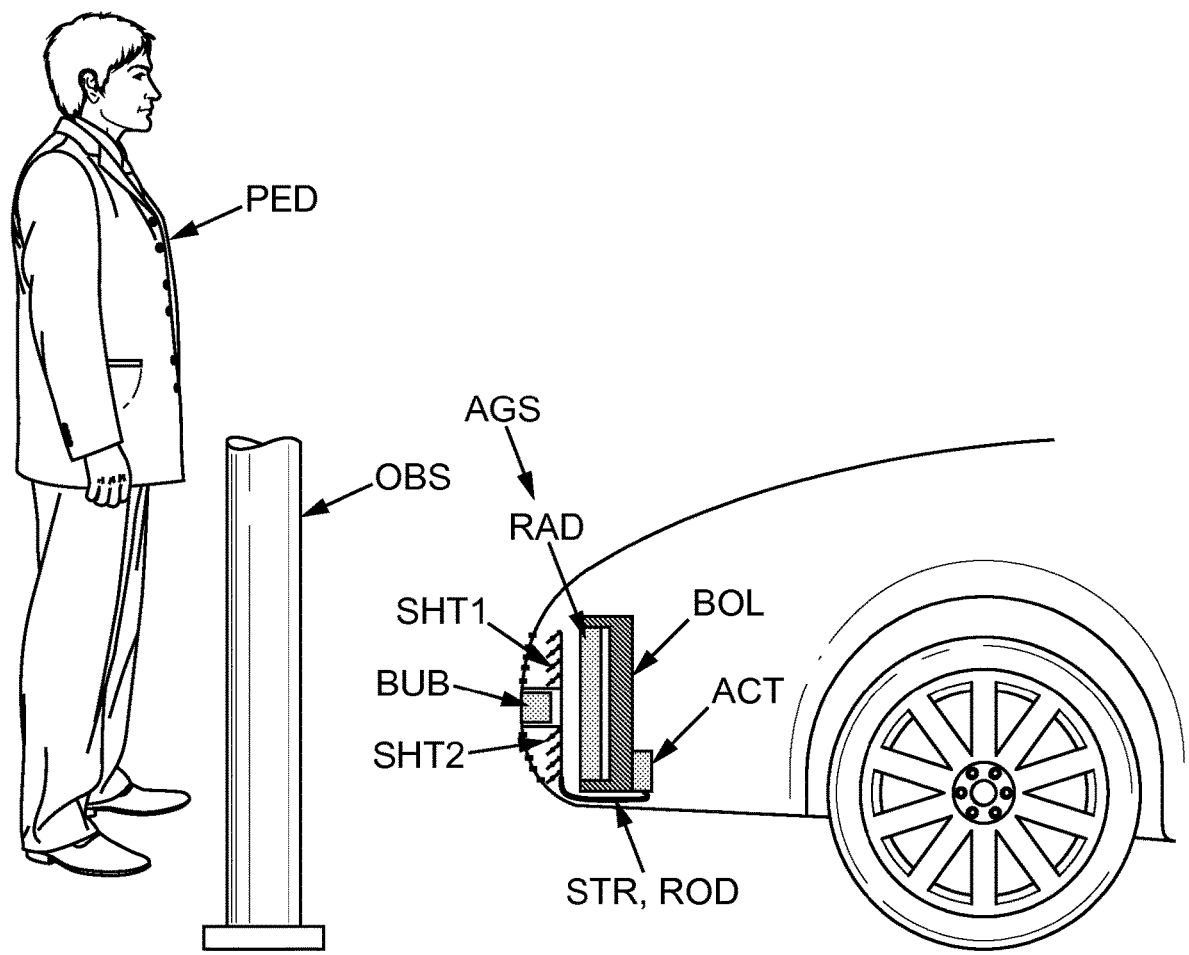
FIG. 4 illustrates an AGS device and a front face module for a motor vehicle according to a possible embodiment of the invention.

FIG. 4 shows, in the form of a longitudinal section, an embodiment of the invention. The air intake control device AGS for a front face module of a motor vehicle comprises a set of shutters able to close the air intake. It comprises, for example, a first series of shutters SHT1 and a second series of shutters SHT2. According to a possible embodiment, all shutters of the first series SHT1 are connected together, for example via a connecting rod, such that they are all moved simultaneously. According to a possible embodiment, all shutters of the second series SHT2 are connected together such that they are all moved simultaneously. According to a possible embodiment, all shutters of the first series SHT1 and of the second series SHT2 are connected together such that they are all moved simultaneously (the shutters of both shutter series are moved simultaneously).

The device AGS comprises an actuator ACT, for example electric, configured to control the shutters. The actuator ACT comprises, for example, a servo motor or a set of servo motors. The actuator ACT may be connected to a computer which receives information from various sensors (engine temperature sensor, external temperature sensor, vehicle speed sensor etc.) and, as a function of the information received, orders the closure or opening of the shutters by the servo motor(s). The device AGS may also comprise several actuators ACT. Alternatively, the actuator ACT may comprise sub-elements each playing the role of an autonomous actuator.

According to the embodiment illustrated in FIG. 4, the front face module also comprises a bumper beam BUB placed in a horizontal plane of the motor vehicle, perpendicularly to a longitudinal axis of the vehicle. The actuator ACT of the device AGS is here fixed to a support BOL (bolster) of the radiator RAD. The actuator ACT is therefore situated outside the critical path and carries less risk of being damaged and of causing injury, since it is protected by the support BOL of the radiator RAD and by the radiator RAD itself. The remote actuator ACT controls a first series of shutters SHT1 (corresponding to the high path of the device AGS) and a second series of shutters SHT2 (corresponding to the low path of the device AGS).

The device AGS comprises a flexible connection linking the electric actuator ACT with the shutters. The fact that the connection is a flexible connection, instead of a connection based on integration of the actuator ACT in the immediate vicinity of the shutters (for example, via a lever extending from the actuator and directly controlling the shutters), allows the actuator ACT to be placed remotely. This prevents the actuator ACT, on an impact of the motor vehicle with an entity (such as a pedestrian PED, or an obstacle OBS such as a post), from damaging (directly or indirectly) the obstacle OBS or the pedestrian PED, and vice versa. This may even prevent any contact between the actuator ACT and the entity OBS, PED which is in collision with the vehicle. This reduces the risk of serious injury to the pedestrian PED or damage caused to the actuator ACT by the obstacle OBS (or even its destruction).

According to the embodiment illustrated in FIG. 4, the flexible connection of the air intake control device AGS comprises a cable STR, for example of the piano wire type. It may also comprise several cables, each controlling a separate set of shutters.

According to another embodiment, the flexible connection of the air intake control device AGS comprises a (or several) linkage(s) ROD. According to certain embodiments, the actuator comprises several servo motors, each of which may be connected to some of the shutters via a specific flexible connection. It is possible to prefer a cable STR for certain shutters and a linkage ROD for others, in particular as a function of the dimensions of the front face module.

Another embodiment relates to a front face module for a motor vehicle comprising a protection element. The term "protection" means that the element concerned is not affected by a minor collision involving the motor vehicle, such as an impact of the parking type. The protection element may comprise elements of a nature to absorb mechanical shocks. The protection element may also have a significant mechanical strength, greater for example than that of conventional bodywork or that of the shutters of an AGS (which are typically made of fairly fragile plastic). Conventional bodywork may easily be dented or creased on a mechanical impact, thus damping such a shock. The protection element may have a mechanical strength comparable to that of the actuator itself. According to a possible embodiment, the protection element is more resistant to mechanical shocks than the actuator. The protection element may in particular be a structural element of the front face module, or an element fixed in the module or structure of the front face.

The front face module also comprises an air intake control device AGS according to one of the preceding embodiments, wherein the actuator ACT of the air intake control device is fixed on the protection element.

The protection element is situated between the electric actuator ACT and any possible impact point. Thus in the case of even a fairly violent collision with an obstacle OBS, the protection element isolates the actuator ACT from the obstacle OBS which could otherwise damage it. In the case of a collision with a pedestrian PED, the pedestrian PED is no longer at risk of injury from the actuator ACT. If the protection element is sufficiently set back relative to the front of the vehicle, the impact of an obstacle against the vehicle may be damped by elements which are more fragile than the protection element or at least situated further upstream on the critical path.

It is understood that the actuator ACT is either remote from the impact zone, or placed behind a rigid protection element such that it is no longer liable to be damaged or cause injury.

According to one embodiment (not shown), the protection element is a bumper beam. Such a bumper beam BUB has a significant mechanical strength and will better resist impacts with an obstacle OBS. In this embodiment, the actuator ACT is fixed on the bumper beam BUB and thus protected from impact.

Another embodiment relates to a front face module for a motor vehicle according to the preceding embodiment in which the bumper beam BUB is placed in a horizontal plane of the motor vehicle, perpendicularly to a longitudinal axis of the vehicle, with a first series of shutters SHT1 located above the bumper beam BUB and a second series of shutters SHT2 located below the bumper beam BUB. The first series of shutters thus constitutes a high path and the second series SHT2 constitutes a low path. The low path is often larger in size than the high path. But in certain embodiments, a reverse configuration may be selected, and in other embodiments the two parts are of identical or similar size (their shapes may nonetheless be different). The size designates the surface area of the air intake defined by the shutters concerned.

The actuator ACT, for example electric, is configured to control the two series of shutters SHT1, SHT2 independently. Thus one path may be devoted for example to cooling a turbo radiator (in the case of a motor vehicle equipped with a turbocharged engine), while the other may be dedicated for example to cooling an oil radiator. It is possible to provide more than two paths. Each path may be controlled as a function of its specific parameters (for example: temperature of turbocharger, temperature of oil radiator etc.) and where applicable common parameters (vehicle speed for example).

Another embodiment relates to a front face module for a motor vehicle according to the embodiment illustrated in FIG. 4.

The front face module comprises a radiator support BOL, and a radiator RAD supported by said radiator support BOL. This radiator support BOL constitutes a protection element. An obstacle coming into collision with the vehicle must at least pass through the radiator RAD and its support BOL before it can damage the electrical actuator ACT which is fixed to the support BOL.

Figure 5:
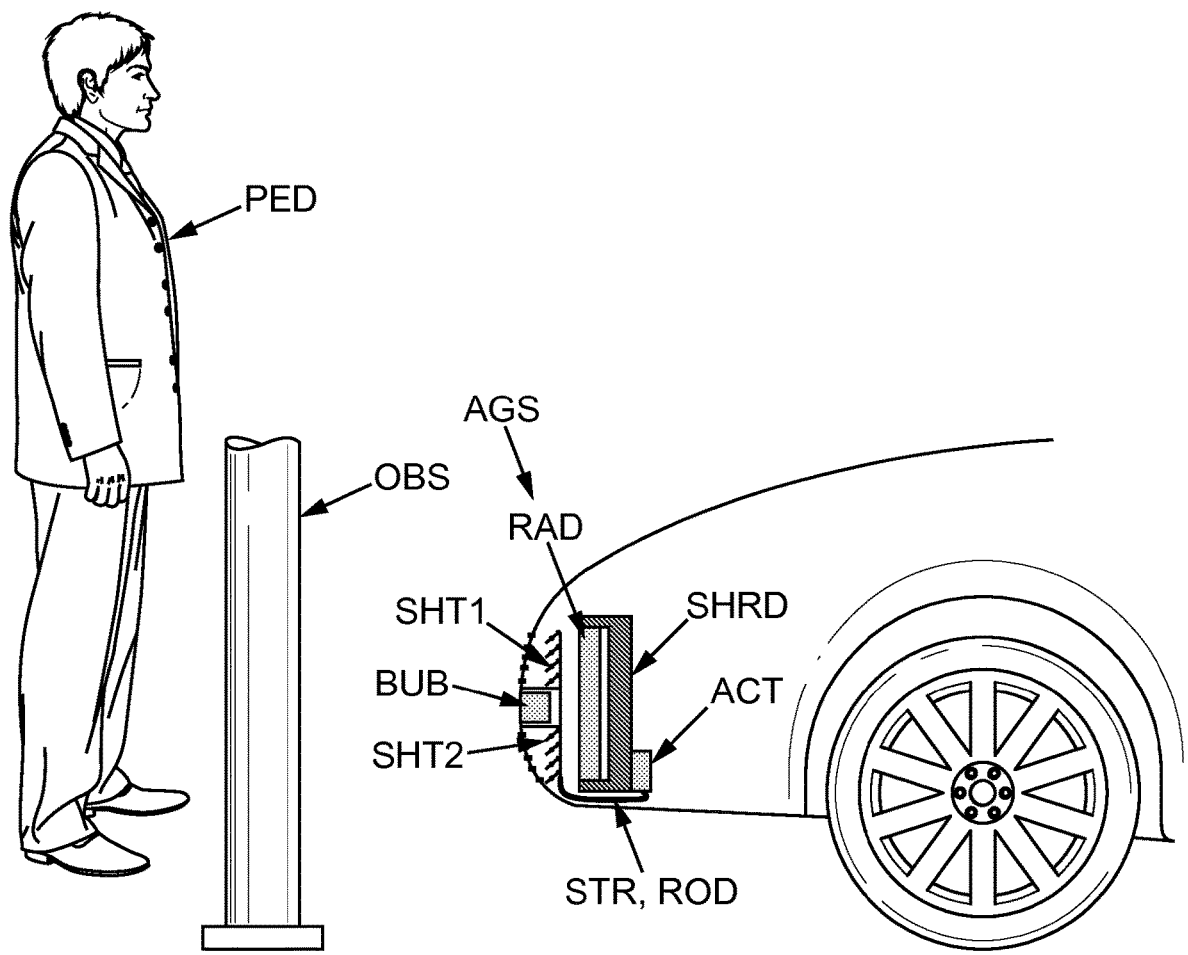
FIG. 5 illustrates an AGS device and a front face module for a motor vehicle according to another possible embodiment of the invention.

Another embodiment illustrated in FIG. 5 relates to a front face module for a motor vehicle, comprising a radiator and a fan system.

Said fan system comprises a shroud SHRD corresponding to a support element and carrying one or more fans or blade sets (not shown), fixed behind the radiator RAD in order to conduct the air passing through the radiator RAD towards the engine compartment. The term "behind" signifies downstream relative to the air flow, or in other words that the radiator RAD is situated between the shroud SHRD and the series of shutters SHT1, SHT2 of the device AGS.

The presence of the shroud SHRD prevents the air drawn in by the fans from being able to contain air other than that which has passed through the radiator RAD.

The fans are in fact intended substantially to cool the radiator RAD. The actuator ACT is fixed on the inside of or on the shroud SHRD, wherein the shroud SHRD may thus correspond to the protection element. The function of an electrical actuator is generally guaranteed within a temperature range from −40° C. to 85° C., and it may therefore function within the shroud.

Other locations may be considered for the actuator ACT. It is sufficient that the location selected for fixing the actuator ACT observes the operating temperature range of the actuator ACT, that it keeps the actuator ACT sheltered thanks to a protection element, and that it ensures sufficient accessibility to the shutters of the air intake device AGS via one or more linkage(s), one or more cable(s) or any other suitable flexible connection(s). Naturally, the actuator ACT may comprise sub-elements which may each, in some cases, constitute autonomous actuators. These various actuators ACT may then be each fixed at separate locations.

It must be understood however that the exemplary embodiments are given merely for illustration of the subject of the invention. The invention is not limited to the embodiments described above and given merely as examples. It includes various modifications, alternative forms and other variants which the person skilled in the art may consider in the context of the present invention, and in particular any combination of the various embodiments described above.

The invention claimed is:

1. An air intake control device for a front face module for a motor vehicle, comprising:
   shutters;
   an actuator arranged so as to control the shutters; and
   a flexible connection connecting the actuator to the shutters and able to relocate the actuator from being adjacent to the shutter to a more remote location during assembly, providing a separation between the actuator and the shutter in the event of a collision of the motor vehicle,
   wherein the front face module for the motor vehicle comprises a radiator support and a radiator, the radiator support comprising a protection element to isolate the actuator from an obstacle in the event of the collision, and
   the protection element is disposed between the actuator and the shutters such that, in a viewing direction along a longitudinal direction of the motor vehicle, the protection element is behind the shutters.

2. The air intake control device as claimed in claim 1, wherein the flexible connection comprises a cable.

3. An air intake control device for a front face module for a motor vehicle, comprising:
   shutters;
   an actuator arranged so as to control the shutters; and
   a flexible connection connecting the actuator to the shutters and able to relocate the actuator from being adjacent to the shutter to a more remote location during assembly, providing a separation between the actuator and the shutter in the event of a collision of the motor vehicle,
   wherein the flexible connection comprises a linkage,
   the front face module for the motor vehicle comprises a radiator support and a radiator, the radiator support comprising a protection element to isolate the actuator from an obstacle in the event of the collision, and
   the protection element is disposed between the actuator and the shutters such that, in a viewing direction along a longitudinal direction of the motor vehicle, the protection element is behind the shutters.

4. A front face module for a motor vehicle comprising:
   a protection element; and
   an air intake control device for the front face module for the motor vehicle, comprising:
      shutters;
      an actuator arranged so as to control the shutters; and
      a flexible connection connecting the actuator to the shutters and able to relocate the actuator from being adjacent to the shutter to a more remote location during assembly, providing a separation between the actuator and the shutter in the event of a collision of the motor vehicle,
   wherein the actuator is fixed to the protection element,
   the front face module for the motor vehicle comprises a radiator support and a radiator, the radiator support comprising the protection element to isolate the actuator from an obstacle in the event of the collision, and the protection element is disposed between the actuator and the shutters such that, in a viewing direction along a longitudinal direction of the motor vehicle, the protection element is behind the shutters.

5. The front face module for a motor vehicle as claimed in claim 4, wherein said protection element comprises a bumper beam.

6. The front face module for a motor vehicle as claimed in claim 5, wherein a first series of shutters is located above the bumper beam, and a second series of shutters is located below the bumper beam, the actuator being arranged to control the two series of shutters independently.

7. The front face module for a motor vehicle as claimed in claim 4, comprising a shroud fixed behind the radiator to conduct the air passing through the radiator, wherein the actuator is fixed at least one of inside of the shroud and on the shroud.

* * * * *